US012438298B2

(12) United States Patent
Acera et al.

(10) Patent No.: US 12,438,298 B2
(45) Date of Patent: Oct. 7, 2025

(54) ELECTRICAL CONNECTOR ASSEMBLY

(71) Applicant: BELLWETHER ELECTRONIC CORP., Taoyuan (TW)

(72) Inventors: Jimmy Enrique Acera, Taoyuan (TW); Robert Hla Thein, Fremont, CA (US)

(73) Assignee: BELLWETHER ELECTRONIC CORP., Taoyuan (TW)

(*) Notice: Subject to any disclaimer, the term of this patent is extended or adjusted under 35 U.S.C. 154(b) by 376 days.

(21) Appl. No.: 18/177,716

(22) Filed: Mar. 2, 2023

(65) Prior Publication Data

US 2024/0097369 A1 Mar. 21, 2024

(30) Foreign Application Priority Data

Sep. 15, 2022 (TW) ................................. 111134865

(51) Int. Cl.

| | |
|---|---|
| ***H01R 24/00*** | (2011.01) |
| ***H01R 12/75*** | (2011.01) |
| ***H01R 13/11*** | (2006.01) |
| ***H01R 13/50*** | (2006.01) |

(52) U.S. Cl.

CPC ........... *H01R 13/111* (2013.01); *H01R 12/75* (2013.01); *H01R 13/50* (2013.01)

(58) Field of Classification Search

CPC ...... H01R 13/111; H01R 12/75; H01R 13/50; H01R 13/432; H01R 13/506; H01R 12/716; H01R 12/55

See application file for complete search history.

(56) References Cited

U.S. PATENT DOCUMENTS

| | | | | |
|---|---|---|---|---|
| 8,821,170 B1 * | 9/2014 | Thein | H01R 4/4881 | |
| | | | 439/121 | |
| 10,553,976 B1 * | 2/2020 | Thein | H01R 13/035 | |
| 2013/0012072 A1 * | 1/2013 | Costello | H01R 13/18 | |
| | | | 439/786 | |
| 2014/0141655 A1 * | 5/2014 | Do | H01R 24/58 | |
| | | | 439/669 | |
| 2017/0373419 A1 * | 12/2017 | Lee | H01R 12/724 | |
| 2022/0094092 A1 * | 3/2022 | Mincey | H01R 4/2433 | |

* cited by examiner

*Primary Examiner* — Abdullah A Riyami
*Assistant Examiner* — Nelson R. Burgos-Guntin
(74) *Attorney, Agent, or Firm* — Li & Cai Intellectual Property Office

(57) ABSTRACT

An electrical connector assembly is provided. The electrical connector assembly includes a receptacle connector and a plug connector. The receptacle connector includes a housing and at least one electrically conductive terminal. The housing has a first through hole. The at least one electrically conductive terminal is disposed in the housing. The at least one electrically conductive terminal includes a crown spring portion and a first extending portion. The first extending portion is connected to the crown spring portion. The crown spring portion includes a plurality of contact arms. The first extending portion includes a plurality of first pins. The crown spring portion is located in the first through hole, and the first pins are exposed from the housing. The plug connector is inserted into the first through hole and contacts the contact arms.

11 Claims, 17 Drawing Sheets

ELECTRICAL CONNECTOR ASSEMBLY

CROSS-REFERENCE TO RELATED PATENT APPLICATION

This application claims the benefit of priority to Taiwan Patent Application No. 111134865, filed on Sep. 15, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electrical connector assembly, and more particularly to a high-power electrical connector assembly.

BACKGROUND OF THE DISCLOSURE

An electrical connector is mainly used as a current transmission medium between different components, such as a circuit board and a conductive cable. In the related art, when a current is transmitted to pass through multiple conductive elements inside the electrical connector, contact resistances between multiple conductive elements cause a temperature inside the electrical connector to rise and the service life of the electrical connector to be reduced.

Therefore, how to overcome the above-referenced inadequacy through an improvement in structural design has become one of the important issues to be solved in this field.

SUMMARY OF THE DISCLOSURE

In response to the above-referenced technical inadequacy, the present disclosure provides an electrical connector assembly.

In one aspect, the present disclosure provides an electrical connector assembly that includes a receptacle connector and a plug connector. The receptacle connector includes a housing and at least one electrically conductive terminal. The housing has a first through hole. The at least one electrically conductive terminal is disposed in the housing. The at least one electrically conductive terminal includes a crown spring portion and a first extending portion. The first extending portion is connected to the crown spring portion, and the crown spring portion includes a plurality of contact arms. The first extending portion includes a plurality of first pins. The crown spring portion is located in the first through hole. The first pins are exposed from the housing. The plug connector is inserted into the first through hole and contacts the contact arms.

Therefore, in the electrical connector assembly provided by the present disclosure, by virtue of "the crown spring portion being located in the first through hole" and "the plug connector being inserted into the first through hole and contacting the contact arms," the crown spring portion is electrically connected to the plug connector. In this way, the electrical connector assembly can carry a large current, and a number of pluggable times can be increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
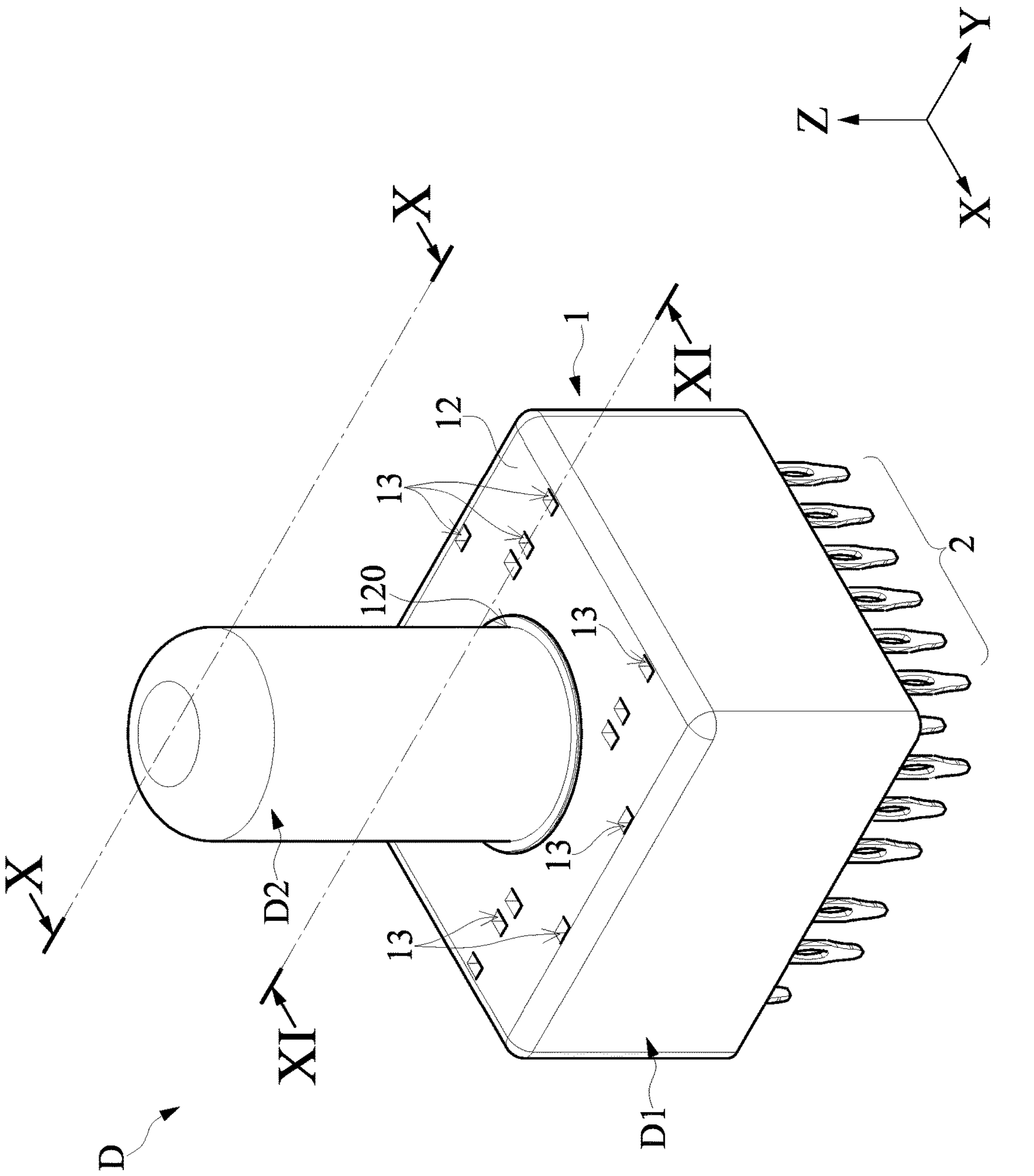
FIG. 1 is a schematic view of an electrical connector assembly according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
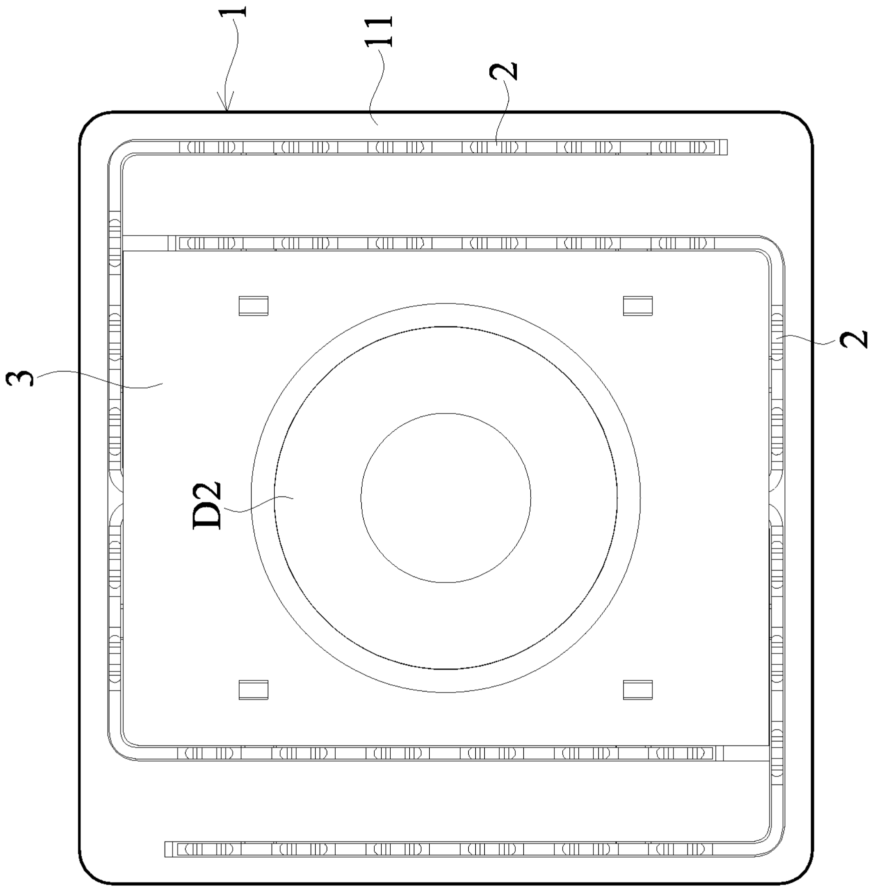
FIG. 2 is a schematic bottom view of the electrical connector assembly according to the first embodiment of the present disclosure.
Figure 3:
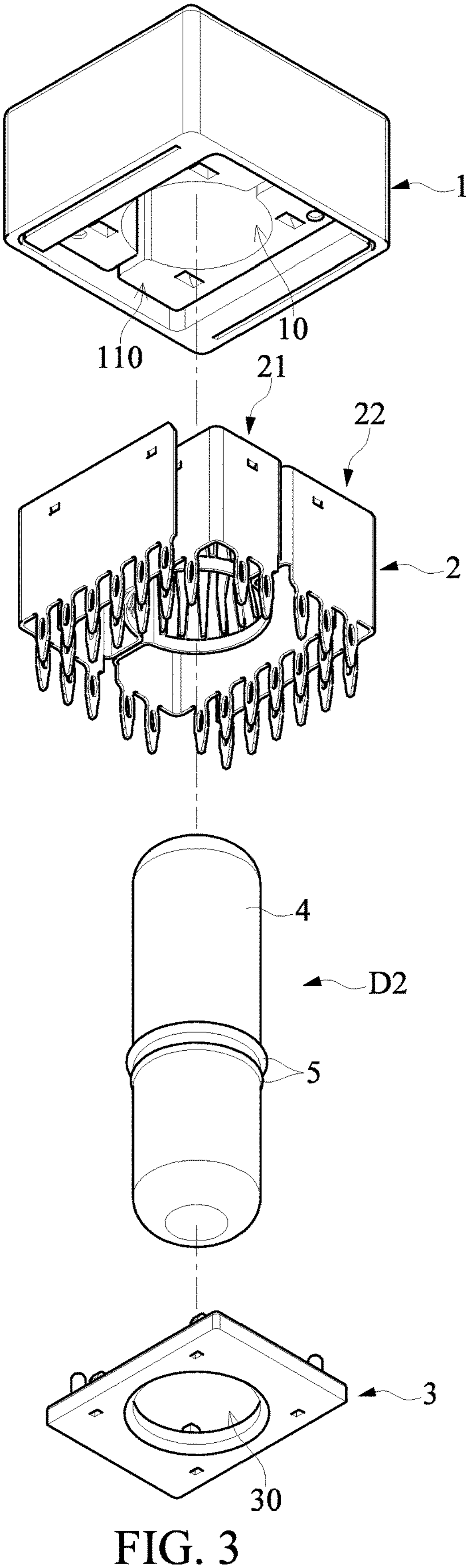
FIG. 3 is a schematic exploded view of the electrical connector assembly according to the first embodiment of the present disclosure.

Referring to FIG. 1 to FIG. 3, FIG. 1 is a schematic view of an electrical connector assembly according to a first embodiment of the present disclosure, FIG. 2 is a schematic bottom view of the electrical connector assembly according to the first embodiment of the present disclosure, and FIG. 3 is a schematic exploded view of the electrical connector assembly according to the first embodiment of the present disclosure. The present disclosure provides an electrical connector assembly D, which includes a receptacle connector D1 and a plug connector D2. The receptacle connector D1 includes a housing 1 and an electrically conductive terminal set 2. The housing 1 has a first through hole 10. The electrically conductive terminal set 2 is disposed in the housing 1. The electrically conductive terminal set 2 includes a first electrically conductive terminal 21 and a second electrically conductive terminal 22. As shown in FIG. 3, the first electrically conductive terminal 21 and the second electrically conductive terminal 22 are point-symmetrical and not in physical contact with each other.

Figure 4:
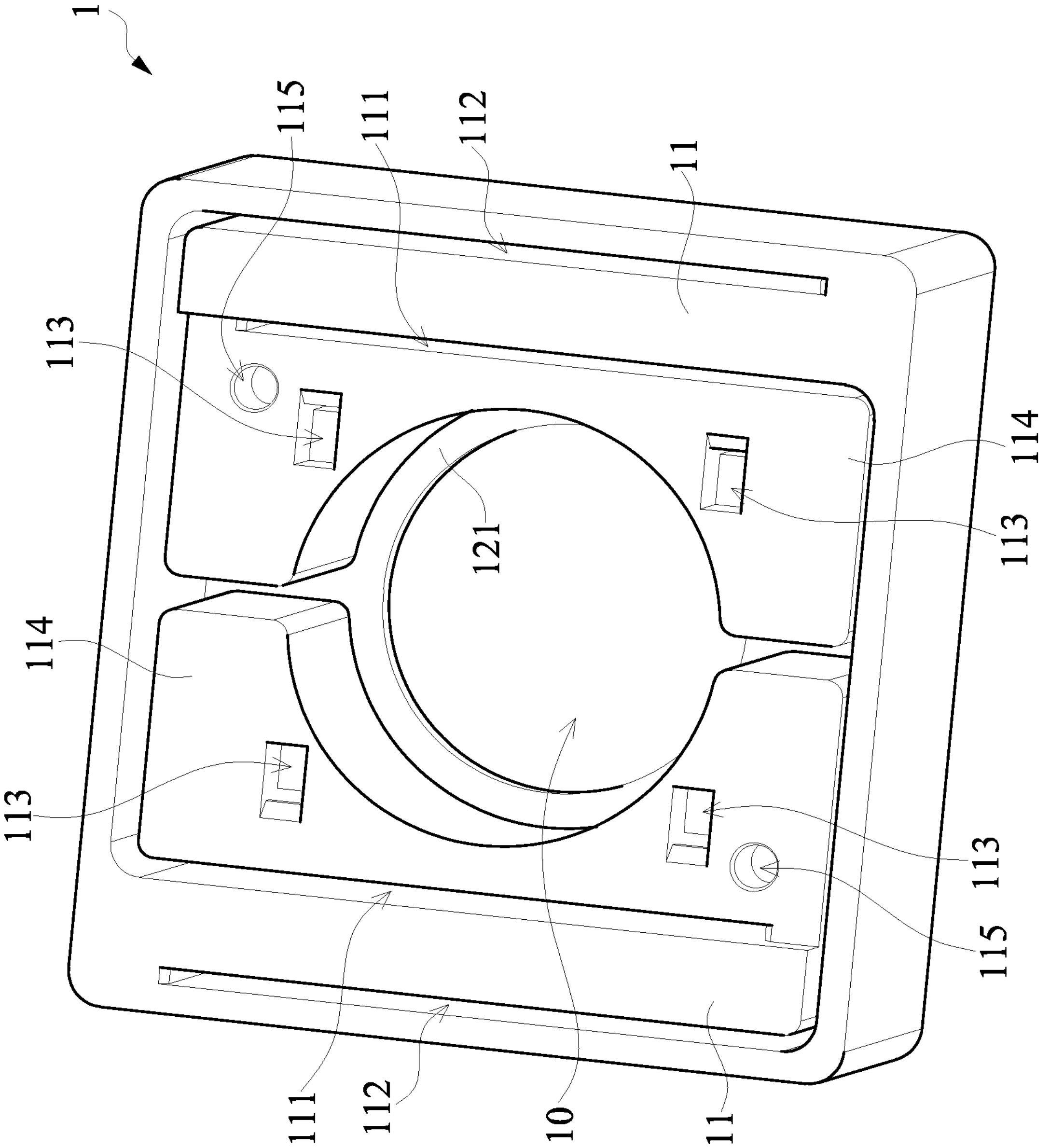
FIG. 4 is a schematic view of a housing of the electrical connector assembly according to the first embodiment of the present disclosure.

Reference is made to FIG. 1, FIG. 3, and FIG. 4, in which FIG. 4 is a schematic view of a housing of the electrical connector assembly according to the first embodiment of the present disclosure. The housing 1 has a first surface 11 and a second surface 12 that are opposite to each other. The first surface 11 includes two first slots 111 and two second slots 112. Each of the two first slots 111 and the two second slots 112 is formed to have an L shape. The two first slots 111 and the two second slots 112 are all in communication with the first through hole 10. The two first slots 111 and the two second slots 112 surround the first through hole 10 (as shown in FIG. 4). In addition, a cavity 110 is further formed on the first surface 11 of the housing 1. A bottom surface 114 of the cavity 110 includes a plurality of first retaining grooves 113 and positioning slots 115. Furthermore, the second surface 12 of the housing 1 includes a plurality of second retaining grooves 13.

Figure 7:
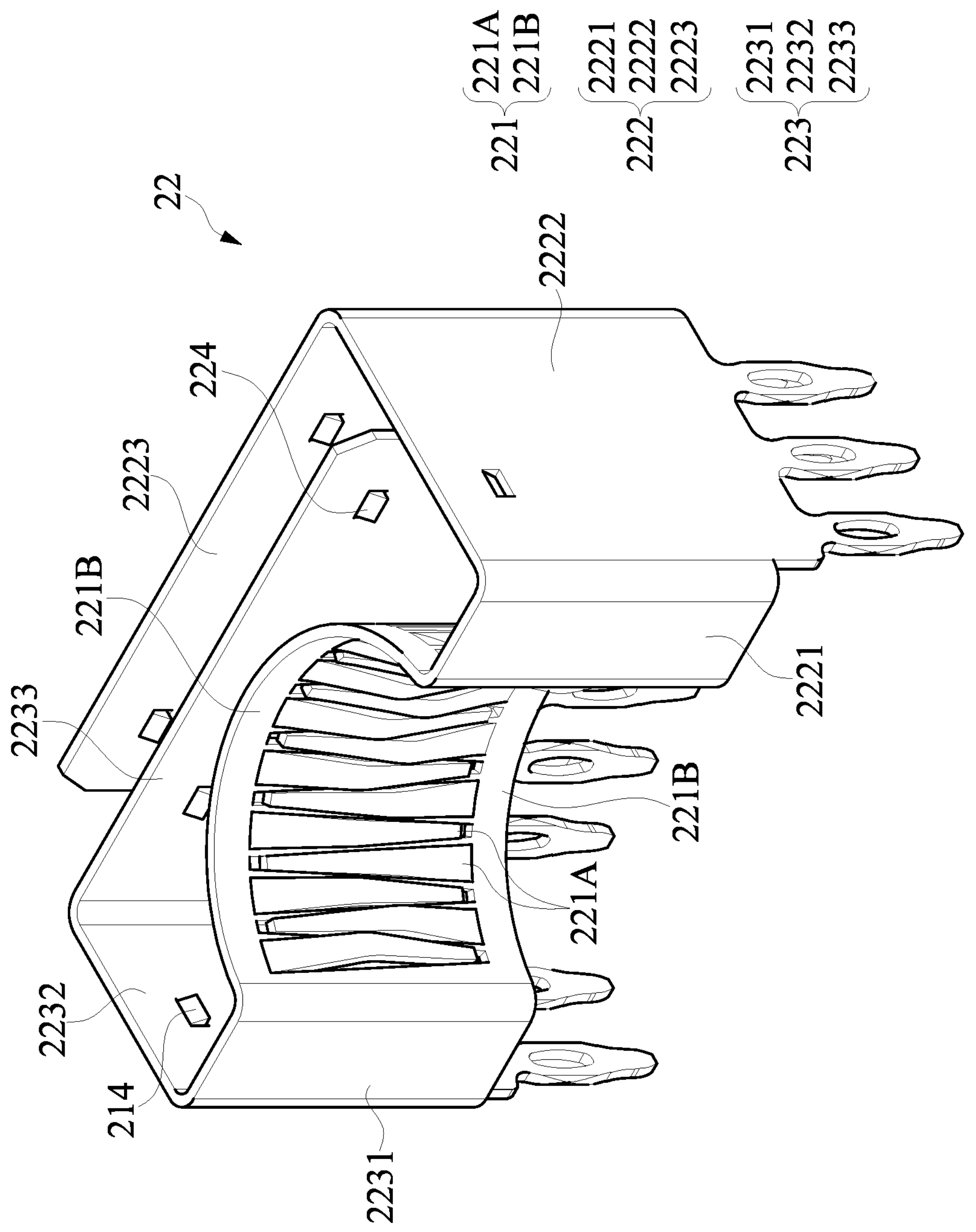
FIG. 7 is a schematic view of a second electrically conductive terminal of the electrical connector assembly according to the first embodiment of the present disclosure.
Figure 8:
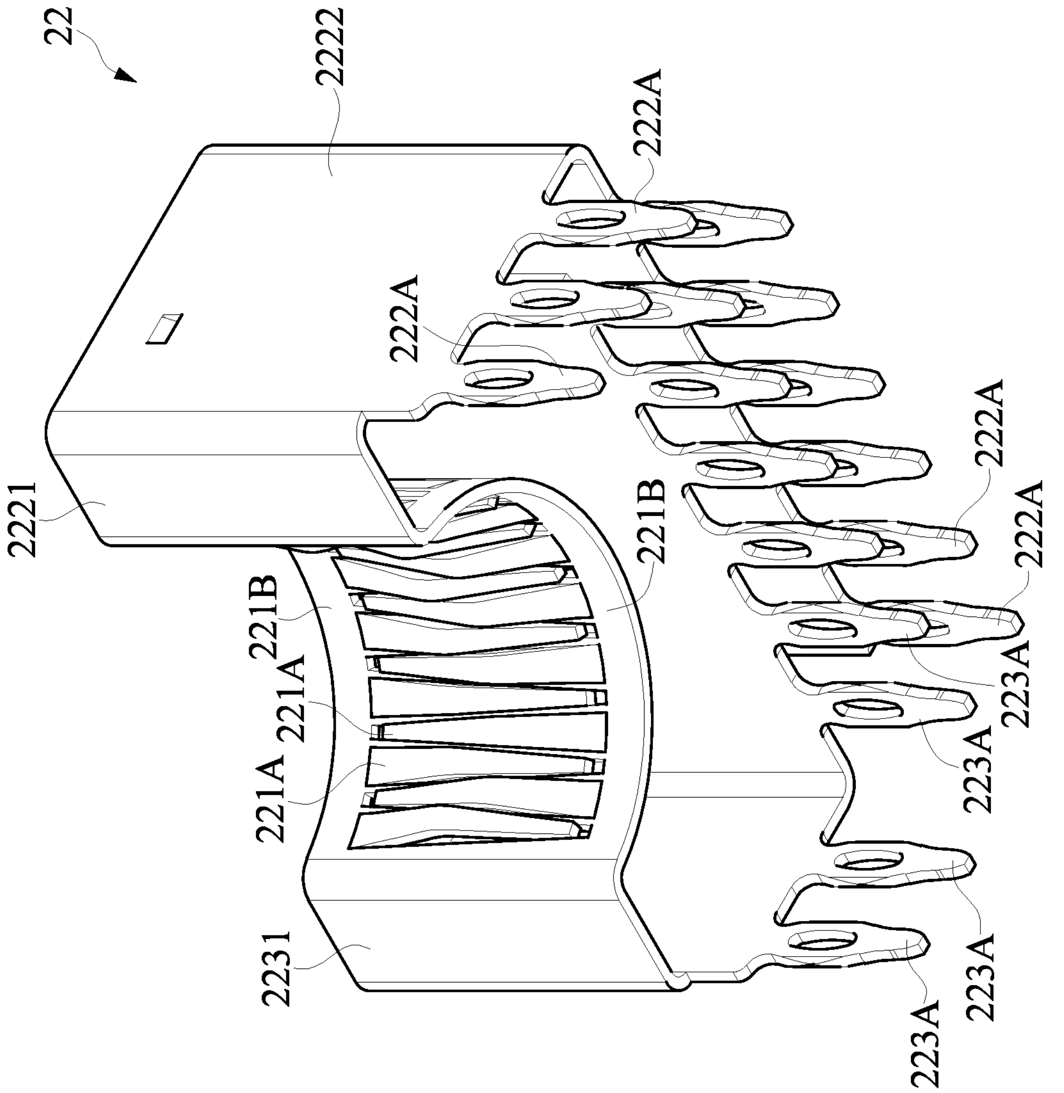
FIG. 8 is another schematic view of the second electrically conductive terminal of the electrical connector assembly according to the first embodiment of the present disclosure.

Referring to FIG. 5 to FIG. 8, FIG. 5 and FIG. 6 are different schematic views of a first electrically conductive terminal of the electrical connector assembly according to the first embodiment of the present disclosure, and FIG. 7 and FIG. 8 are different schematic views of a second electrically conductive terminal of the electrical connector assembly according to the first embodiment of the present disclosure. The first electrically conductive terminal 21 and the second electrically conductive terminal 22 are point-symmetrical, and thus have the same structural features. The first electrically conductive terminal 21 includes a crown spring portion 211, a first extending portion 212, and a second extending portion 213. The first extending portion 212 and the second extending portion 213 are connected to both sides of the crown spring portion 211, respectively. A length of the first extending portion 212 is greater than a length of the second extending portion 213. The crown spring portion 211 includes a plurality of contact arms 211A and two sides 211B opposite to each other. The contact arms 211A are connected to the two sides 211B in a staggered arrangement. The first extending portion 212 includes a plurality of first pins 212A, and the second extending portion 213 includes a plurality of second pins 213A.

Similarly, the second electrically conductive terminal 22 includes a crown spring portion 221, a first extending portion 222, and a second extending portion 223. The first extending portion 222 and the second extending portion 223 are connected to both sides of the crown spring portion 221, respectively. A length of the first extending portion 222 is greater than a length of the second extending portion 223. The crown spring portion 221 includes a plurality of contact arms 221A and two sides 221B opposite to each other. The contact arms 221A are connected to the two sides 221B in a staggered arrangement. The first extending portion 222 includes a plurality of first pins 222A, and the second extending portion 223 includes a plurality of second pins 223A.

Figure 5:
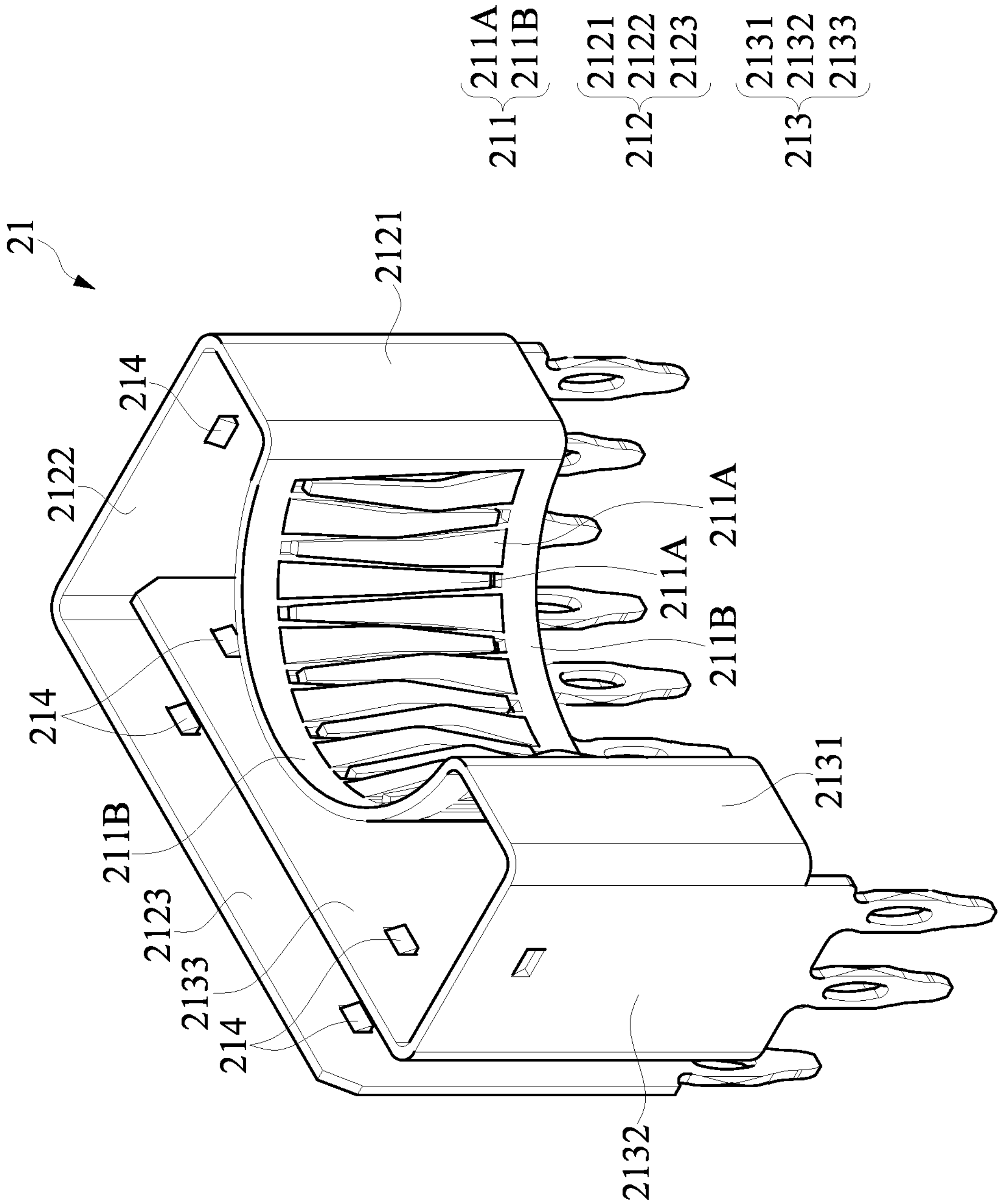
FIG. 5 is a schematic view of a first electrically conductive terminal of the electrical connector assembly according to the first embodiment of the present disclosure.
Figure 6:
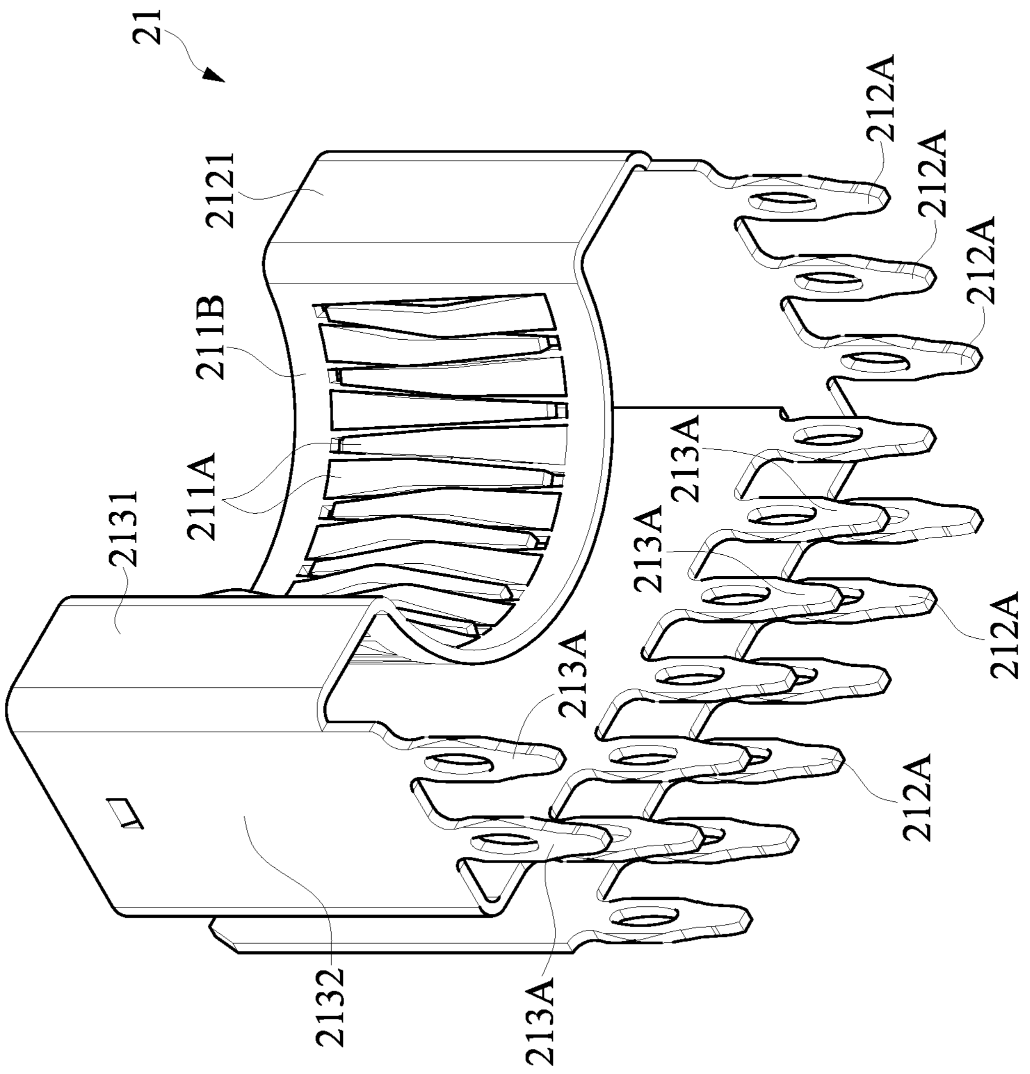
FIG. 6 is another schematic view of the first electrically conductive terminal of the electrical connector assembly according to the first embodiment of the present disclosure.

Reference is made to FIG. 4, FIG. 5, and FIG. 7. When the electrically conductive terminal set 2 is disposed in the housing 1, the two crown spring portions 211, 221 are respectively bent to form two semi-cylindrical shapes, and are disposed opposite to each other in the first through hole 10. The two first extending portions 212, 222 are respectively inserted into the two second slots 112, and the two second extending portions 213, 223 are respectively inserted into the two first slots 111. The first pins 212A, 222A and the second pins 213A, 223A are exposed from the housing 1. In addition, the plug connector D2 is inserted into the first through hole 10 and disposed between the two crown spring portions 211. The plug connector D2 contacts the contact arms 211A, 221A.

The first extending portion 212 of the first electrically conductive terminal 21 includes a first extending section 2121, a second extending section 2122, and a third extending section 2123. The first extending section 2121 is connected to one side of the crown spring portion 211. The second extending section 2122 is connected between the first extending section 2121 and the third extending section 2123. The second extending portion 2122 is bent and extends relative to the first extending section 2121. The third extending portion 2123 is bent and extends relative to the second extending section 2122. The first pins 212A are arranged at a same side of the second extending section 2122 and the third extending portion 2123. The second extending portion 213 includes a fourth extending section 2131, a fifth extending portion 2132, and a sixth extending portion 2133. The fourth extending section 2131 is connected to another side of the crown spring portion 211. The fifth extending section 2132 is connected between the fourth extending section 2131 and the sixth extending portion 2133. The fifth extending portion 2132 is bent and extends relative to the fourth extending section 2131. The sixth extending portion 2133 is bent and extends relative to the fifth extending section 2132. The second pins 213A are arranged at a same side of the fifth extending section 2132 and the sixth extending portion 2133.

Similarly, the first extending portion 222 of the second electrically conductive terminal 22 includes a first extending section 2221, a second extending section 2222, and a third extending section 2223. The first extending section 2221 is connected to one side of the crown spring portion 221. The second extending section 2222 is connected between the first extending section 2221 and the third extending section 2223. The second extending section 2222 is bent and extends relative to the first extending section 2221, and the third extending section 2223 is bent and extends relative to the second extending section 2222. The first pins 222A are arranged at a same side of the second extending section 2222 and the third extending section 2223. The second extending portion 223 includes a fourth extending section 2231, a fifth extending portion 2232, and a sixth extending portion 2233. The fourth extending section 2231 is connected to another side of the crown spring portion 221. The fifth extending section 2232 is connected between the fourth extending section 2231 and the sixth extending portion 2233. The fifth extending portion 2232 is bent and extends relative to the fourth extending section 2231. The sixth extending portion 2233 is bent and extends relative to the fifth extending section 2232. The second pins 223A are arranged at a same side of the fifth extending section 2232 and the sixth extending portion 2233.

Figure 9:
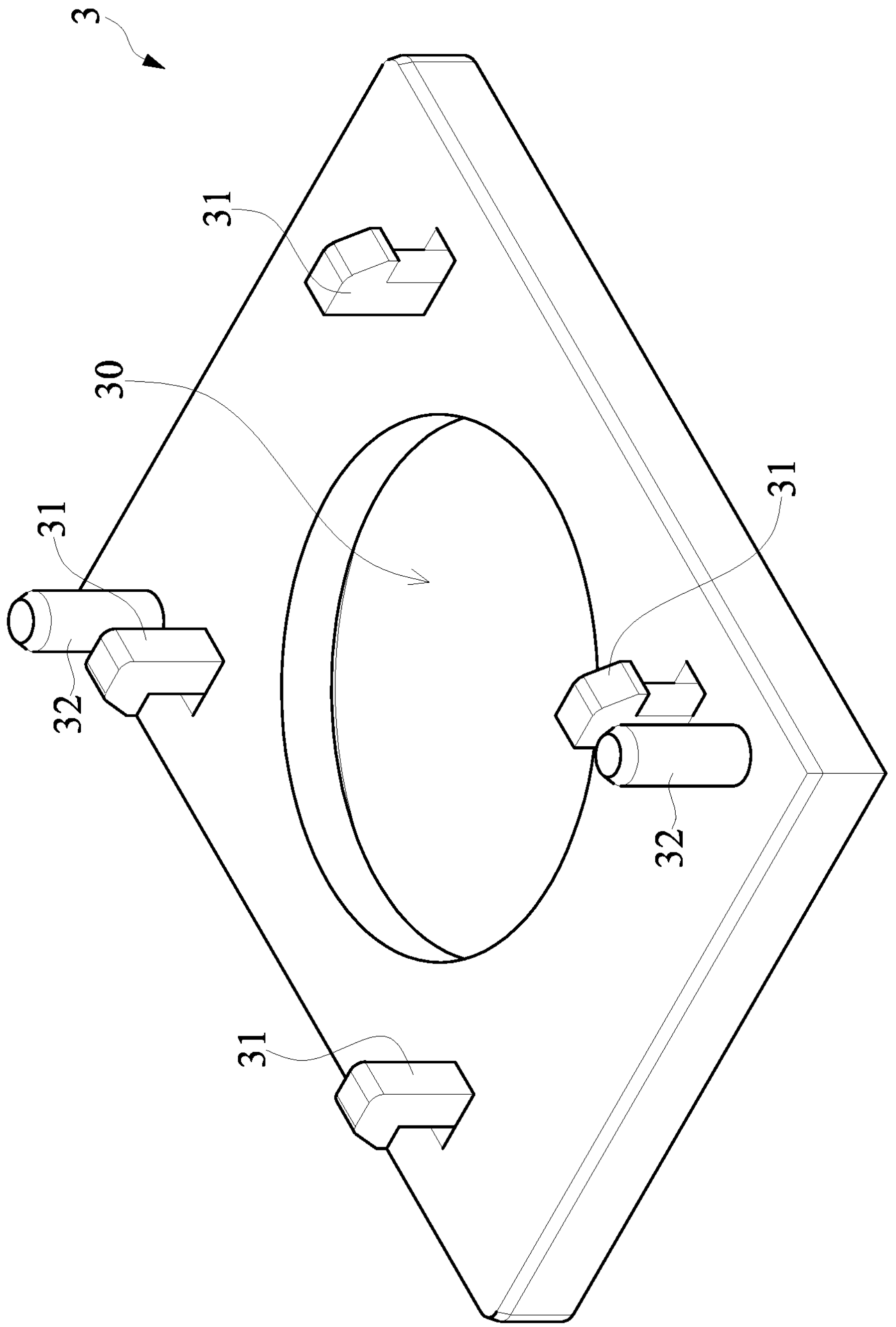
FIG. 9 is a schematic view of a covering plate of the electrical connector assembly according to the first embodiment of the present disclosure.

Reference is made to FIG. 3 and FIG. 9, in which FIG. 9 is a schematic view of a covering plate of the electrical connector assembly according to the first embodiment of the present disclosure. The receptacle connector D1 further includes a covering plate 3. The covering plate 3 is disposed in the cavity 110. The covering plate 3 has a second through hole 30 opposite to the first through hole 10. Therefore, when the plug connector D2 is inserted into the first through hole 10, the plug connector D2 will also pass through the second through hole 30. Specifically, the covering plate 3 further includes a plurality of retaining members 31 and positioning posts 32. When the covering plate 3 is disposed in the cavity 110, the retaining members 31 are respectively clamped in the first retaining grooves 113, and the positioning posts 32 are respectively inserted into the positioning slots 115, such that the covering plate 3 is fixed in the cavity 110.

Figure 10:
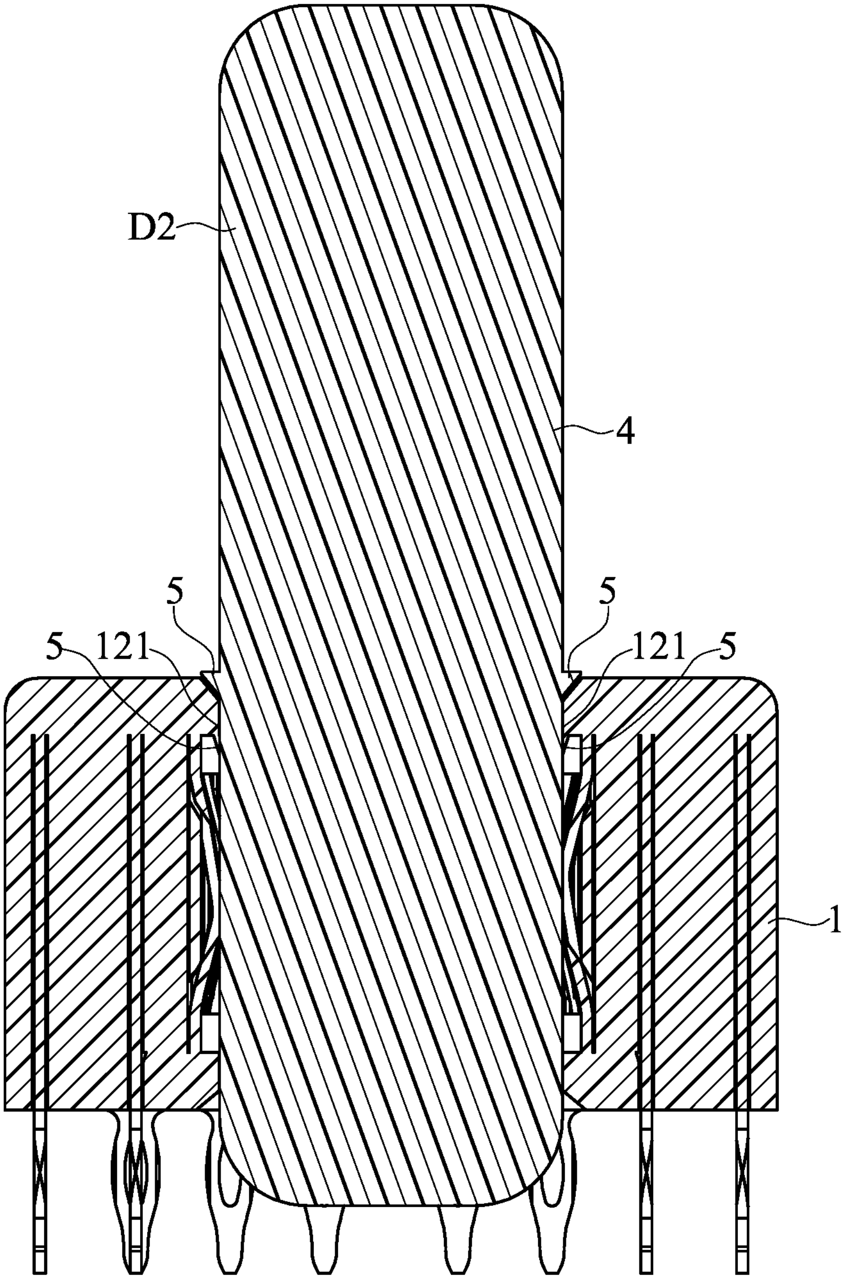
FIG. 10 is a schematic cross-sectional view taken along line X-X of FIG. 1.

Reference is made to FIG. 1, FIG. 4, and FIG. 10, in which FIG. 10 is a schematic cross-sectional view taken along line X-X of FIG. 1. An opening 120 is formed on the second surface 12 (as shown in FIG. 1), and the opening 120 is an opening end of the first through hole 10 formed on the second surface 12. The housing 1 includes a rib 121 formed on an inner edge of the opening 120. As shown in FIG. 3, the plug connector D2 includes a body portion 4 and at least one position limiting portion 5. In the present embodiment, a quantity of the position limiting portion 5 is two, and the two position limiting portions 5 surround the body portion 4. Specifically, when the plug connector D2 is inserted into the housing 1, the body part 4 is inserted into the first through hole 10, and the rib 121 is clamped between the two position limiting portions 5, such that the plug connector D2 is fixed onto the housing 1.

Figure 11:
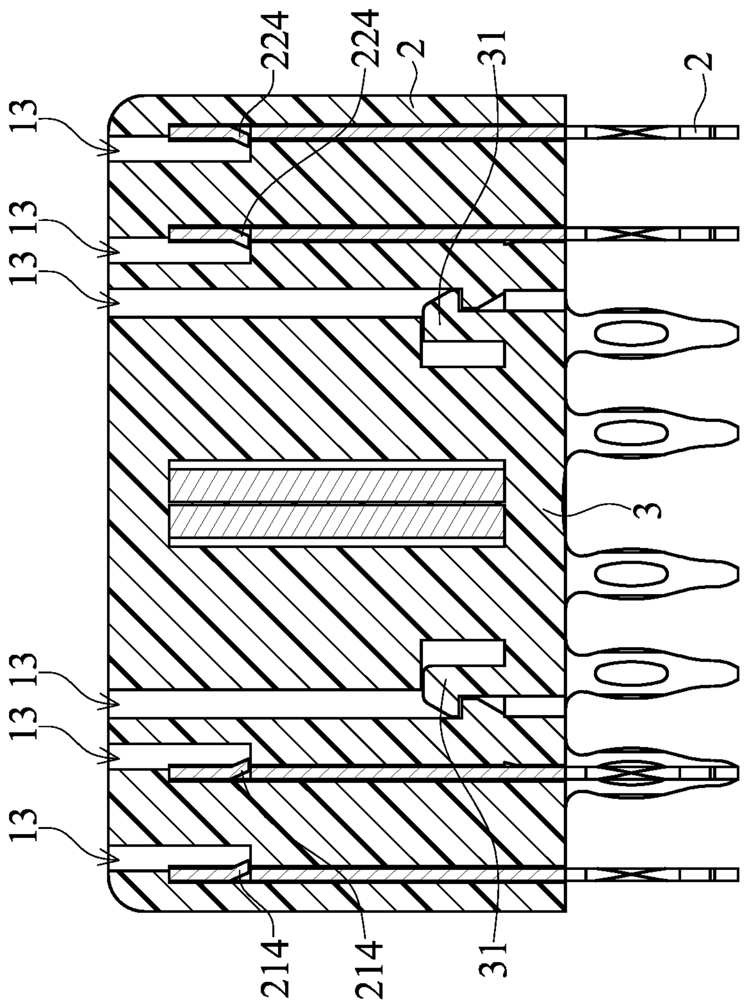
FIG. 11 is a schematic cross-sectional view taken along line XI-XI of FIG. 1.

Reference is made to FIG. 5, FIG. 7, and FIG. 11, in which FIG. 11 is a schematic cross-sectional view taken along line XI-XI of FIG. 1. Each of the first extending portion 212 and the second extending portion 213 of the first electrically conductive terminal 21 includes a plurality of stopping portions 214. Each of the first extending portion 222 and the second extending portion 223 of the second electrically conductive terminal 22 includes a plurality of stopping portions 224. When the first electrically conductive terminal 21 and the second electrically conductive terminal 22 are disposed in the housing 1, the stopping portions 214, 224 are clamped in the second retaining grooves 13, respectively.

Second Embodiment

Figure 12:
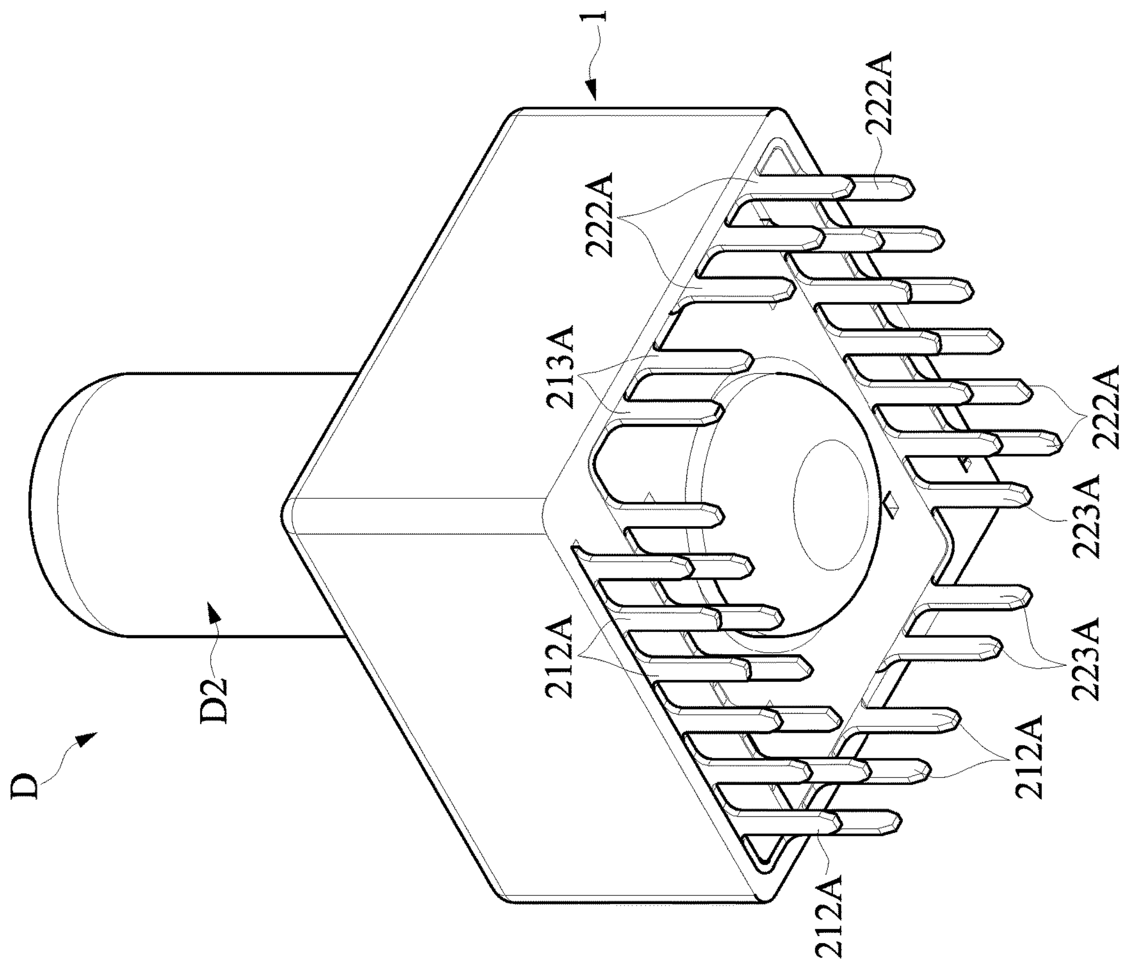
FIG. 12 is a schematic view of an electrical connector assembly according to a second embodiment of the present disclosure.

Referring to FIG. 12, FIG. 12 is a schematic view of an electrical connector assembly according to a second embodiment of the present disclosure. The electrical connector assembly D of the second embodiment has a structure similar to that of the first embodiment, and the similarities therebetween will not be repeated. The main difference between the second embodiment and the first embodiment resides in that, while the first pins 212A, 222A and the second pins 213A, 223A of the electrical connector assembly D of the first embodiment are press-fit pins, the first pins 212A, 222A and the second pins 213A, 223A of the electrical connector assembly D of the second embodiment are dual in-line package pins (DIP pins).

Third Embodiment

Figure 13:
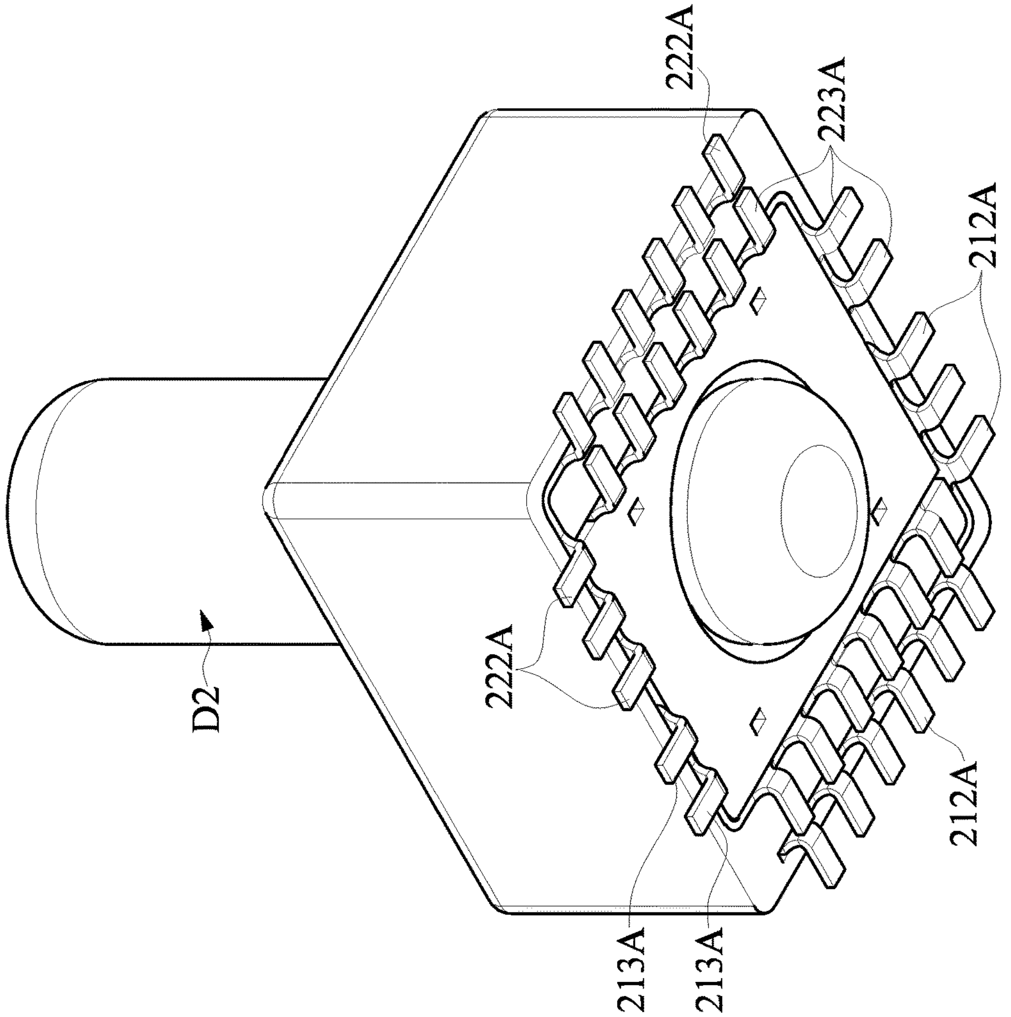
FIG. 13 is a schematic view of an electrical connector assembly according to a third embodiment of the present disclosure.

Referring to FIG. 13, FIG. 13 is a schematic view of an electrical connector assembly according to a third embodiment of the present disclosure. The electrical connector assembly D of the third embodiment has a structure similar to that of the first embodiment, and the similarities therebetween will not be repeated. The main difference between the third embodiment and the first embodiment resides in that, while the first pins 212A, 222A and the second pins 213A, 223A of the electrical connector assembly D of the first embodiment are press-fit pins, the first pins 212A, 222A and the second pins 213A, 223A of the electrical connector assembly D of the third embodiment are surface-mount technology pins (SMT pins).

Fourth Embodiment

Figure 14:
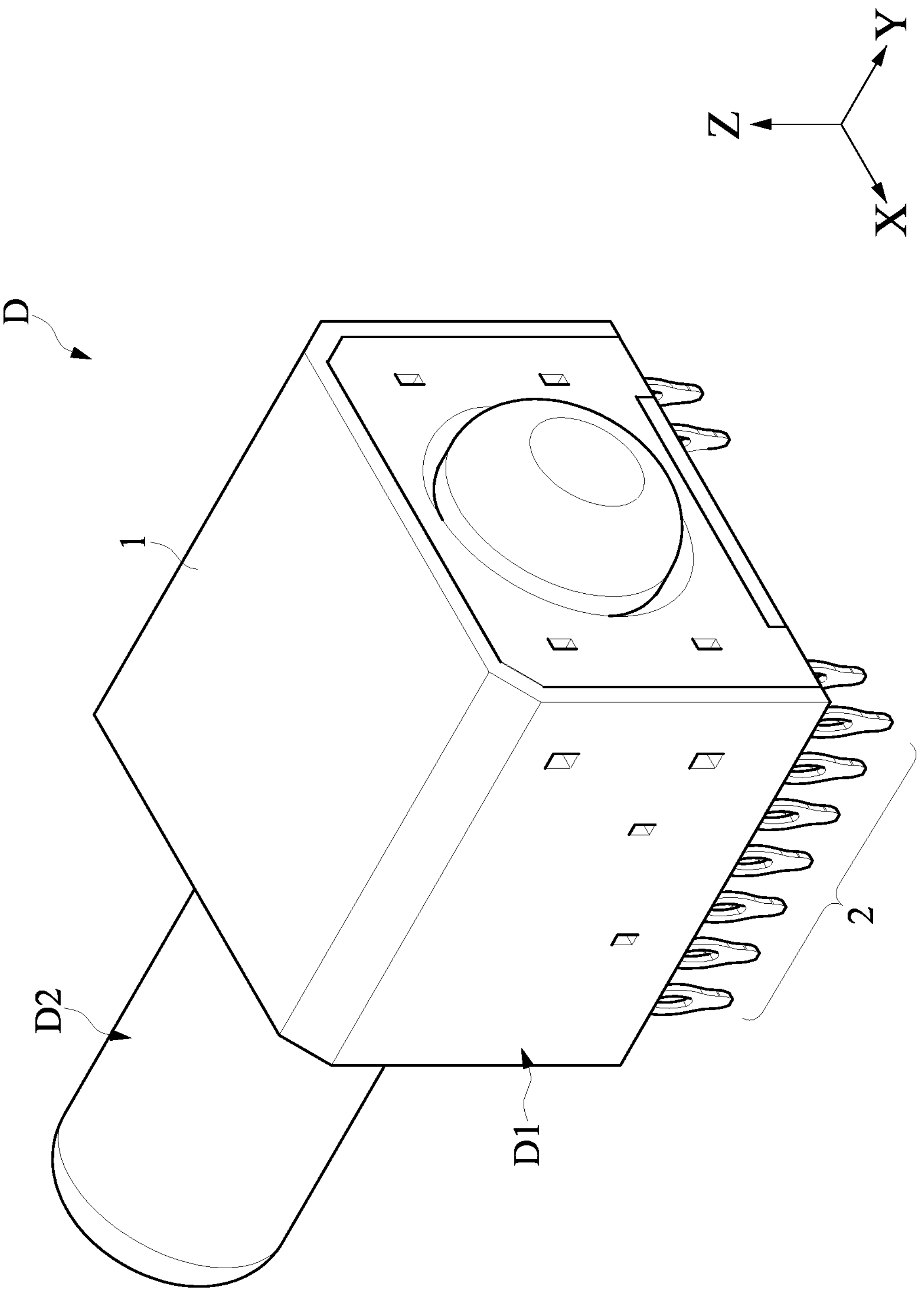
FIG. 14 is a schematic view of an electrical connector assembly according to a fourth embodiment of the present disclosure.
Figure 15:
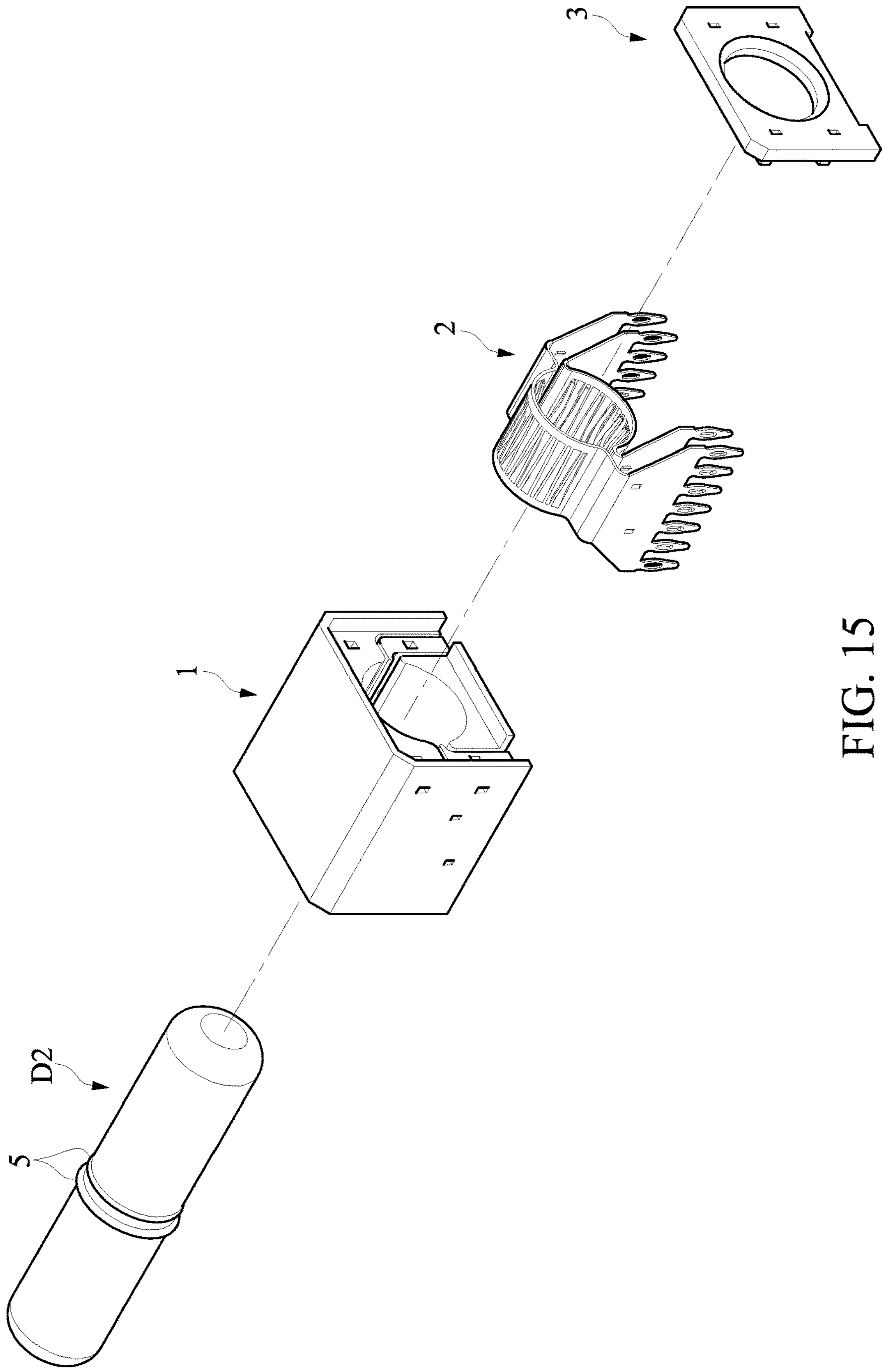
FIG. 15 is a schematic exploded view of the electrical connector assembly according to the fourth embodiment of the present disclosure.

Referring to FIG. 14 and FIG. 15, FIG. 14 is a schematic view of an electrical connector assembly according to a fourth embodiment of the present disclosure, and FIG. 15 is a schematic exploded view of the electrical connector assembly according to the fourth embodiment of the present disclosure. In the present embodiment, the electrical connector assembly D includes a receptacle connector D1 and a plug connector D2. The receptacle connector D1 includes a housing 1, an electrically conductive terminal set 2, and a covering plate 3. The plug connector D2 includes a body portion 4 and two position limiting portions 5 that surround the body portion 4.

Figure 16:
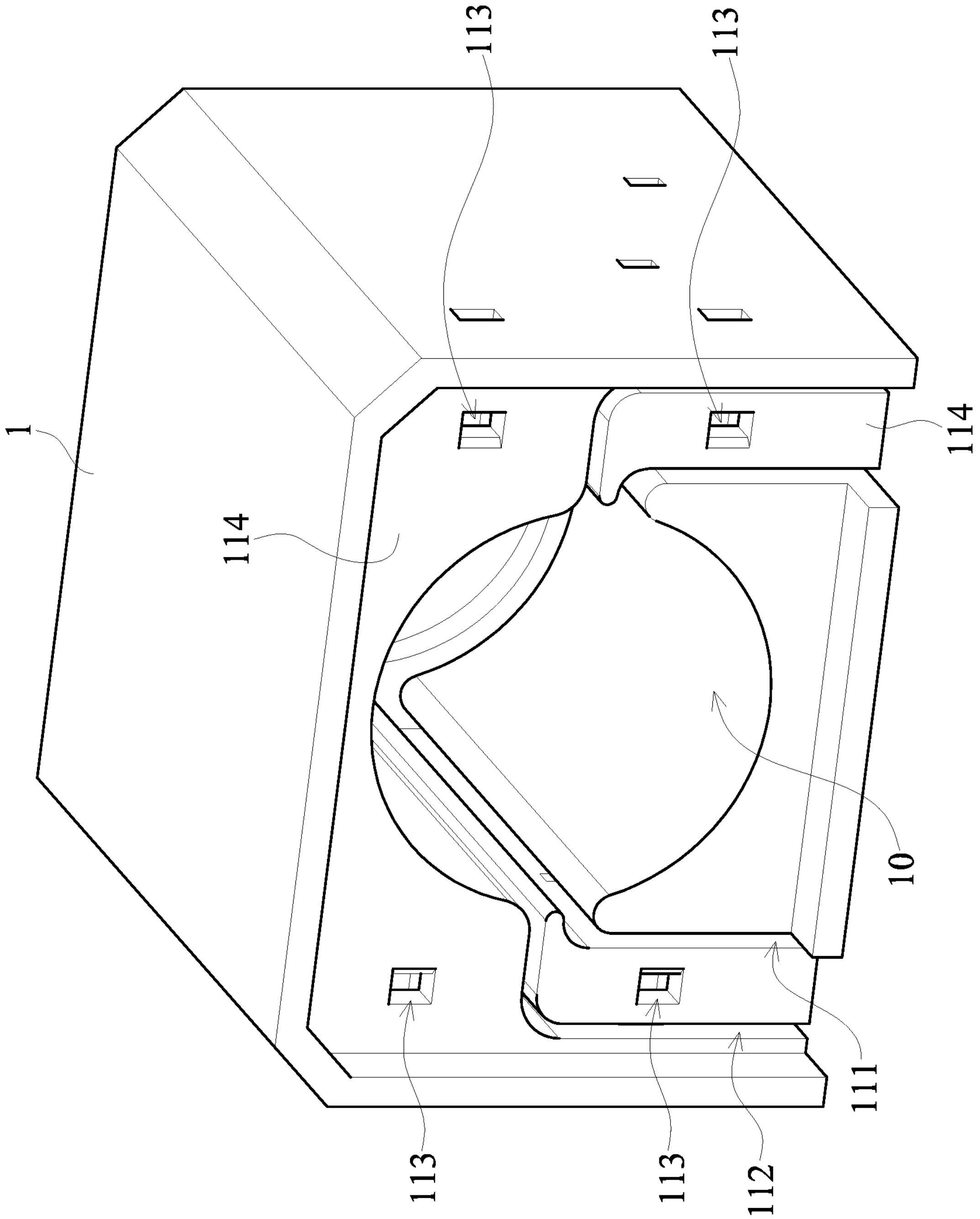
FIG. 16 is a schematic view of a housing of the electrical connector assembly according to the fourth embodiment of the present disclosure.

Referring to FIG. 16, FIG. 16 is a schematic view of a housing of the electrical connector assembly according to the fourth embodiment of the present disclosure. The housing 1 has a first through hole 10, and includes two first slots 111 and two second slots 112. The two first slots 111 and the two second slots 112 are in communication with the first through hole 10. In addition, the housing 1 further includes a plurality of first retaining grooves 113.

Figure 17:
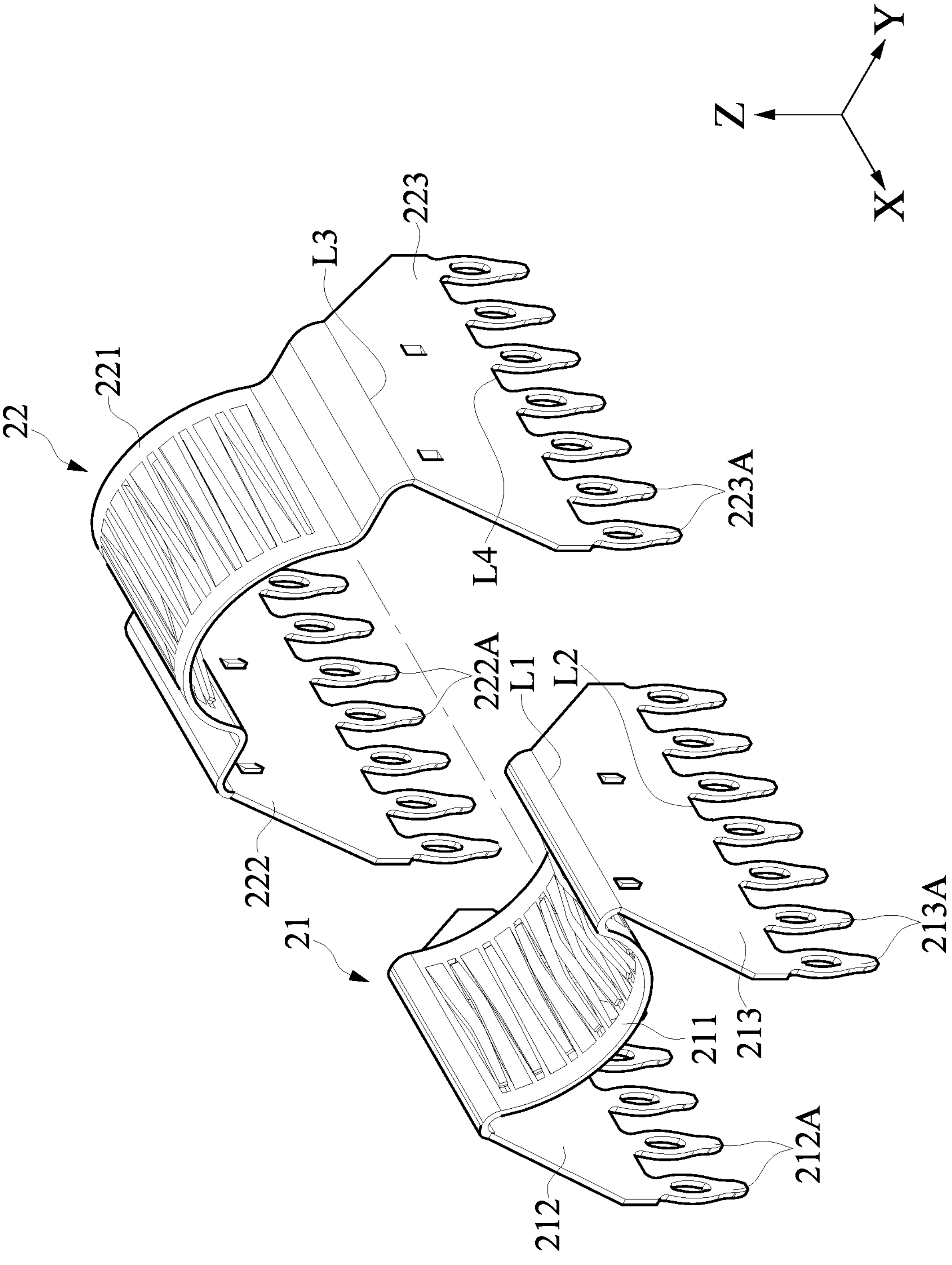
FIG. 17 is a schematic view of an electrically conductive terminal set of the electrical connector assembly according to the fourth embodiment of the present disclosure.

Referring to FIG. 17, FIG. 17 is a schematic view of an electrically conductive terminal set of the electrical connector assembly according to the fourth embodiment of the present disclosure. The electrically conductive terminal set 2 includes a first electrically conductive terminal 21 and a second electrically conductive terminal 22. The first electrically conductive terminal 21 includes a crown spring portion 211, a first extending portion 212, and a second extending portion 213. The first extending portion 212 and the second extending portion 213 are symmetrical to each other. The second extending portion 213 has a first side L1 and a second side L2. A length of the first side L1 is less than a length of the second side L2. A plurality of second pins 213A are arranged at the second side L2. The structure of the first extending portion 212 is the same as that of the second extending portion 213. Each of the first extending portion 212 and the second extending portion 213 has a long side (equivalent to the second side L2) and a short side (equivalent to the first side L1), and the first pins 212A are arranged at the long side.

Similarly, the second electrically conductive terminal 22 includes a crown spring portion 221, a first extending portion 222, and a second extending portion 223. The first extending portion 222 and the second extending portion 223 are symmetrical to each other. The second extending portion 223 has a first side L3 and a second side L4. A length of the first side L3 is less than a length of the second side L4. A plurality of second pins 223A are arranged at the second side L4. The structure of the first extending portion 222 is the same as that of the second extending portion 223. Each of the first extending portion 222 and the second extending portion 223 has a long side and a short side, and the first pins 222A are arranged at the long side.

Moreover, as shown in FIG. 17, a bending direction of the crown spring portion 211 of the first electrically conductive terminal 21 (bent toward a negative Z-axis direction) is the same as an extending direction of the first extending portion 212 and the second extending portion 213 of the first electrically conductive terminal 21 (extending in the negative Z-axis direction). A bending direction of the crown spring portion 221 of the second electrically conductive terminal 22 (bent toward a positive Z-axis direction) is opposite to an extending direction of the first extending portion 222 and the second extending portion 223 of the second electrically conductive terminal 22 (extending in the negative Z-axis direction).

Referring to FIG. 1 and FIG. 14, a comparison can be made between the first embodiment and the fourth embodiment. In the first embodiment, an insertion direction (which is parallel to a Z axis) of the plug connector D2 of the electrical connector assembly D being inserted into the receptacle connector D1 is parallel to an extending direction (which is parallel to the Z axis) of the pins of the electrically conductive terminal set 2 of the receptacle connector D1. In the fourth embodiment, an insertion direction (which is parallel to a Y axis) of the plug connector D2 of the electrical connector assembly D being inserted into the receptacle connector D1 is perpendicular to the extending direction (which is parallel to the Z axis) of the pins of the electrically conductive terminal set 2 of the receptacle connector D1.

Beneficial Effects of the Embodiments

In conclusion, in the electrical connector assembly provided by the present disclosure, by virtue of "the crown spring portion being located in the first through hole" and "the plug connector being inserted into the first through hole and contacting the contact arms," the crown spring portion is electrically connected to the plug connector. In this way, the electrical connector assembly can carry a large current, and a number of pluggable times can be increased. Furthermore, the first electrically conductive terminal 21 and the second electrically conductive terminal 22 of the electrical connector assembly D are integrally formed, and the current flowing through the electrical connector assembly D only passes through the electrically conductive terminal set 2, such that a contact resistance can be effectively reduced and the service life of the electrical connector assembly D can be prolonged.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electrical connector assembly, comprising:

a receptacle connector including:

a housing having a first through hole, wherein the housing has a first surface and a second surface that are opposite to each other, the first surface includes a first slot, and the first slot is in communication with the first through hole; and at least one electrically conductive terminal disposed in the housing, wherein the at least one electrically conductive terminal includes a crown spring portion and a first extending portion, the first extending portion is connected to the crown spring portion, the crown spring portion includes a plurality of contact arms, the first extending portion includes a plurality of first pins, the crown spring portion is located in the first through hole, the first extending portion is disposed in the first slot located on the first surface, and the first pins are exposed from the housing; and a plug connector inserted into the first through hole and contacting the contact arms.

2. The electrical connector assembly according to claim 1, wherein the first pins are surface-mount technology (SMT) pins, dual in-line package (DIP) pins, or press-fit pins.

3. The electrical connector assembly according to claim 1, further comprising a covering plate, wherein the covering plate has a second through hole, a cavity is further formed on the first surface of the housing, the covering plate is disposed in the cavity, the first through hole corresponds to the second through hole, and the plug connector passes through the second through hole.

4. The electrical connector assembly according to claim 3, wherein a bottom surface of the cavity includes a plurality of first retaining grooves, and the covering plate further includes a plurality of retaining members; wherein, when the covering plate is disposed in the cavity, the retaining members are clamped in the first retaining grooves, respectively.

5. The electrical connector assembly according to claim 1, wherein the plug connector includes a body portion and at least one position limiting portion, and the at least one position limiting portion surrounds the body portion.

6. The electrical connector assembly according to claim 5, wherein an opening is formed on the second surface of the housing, and the housing includes a rib formed on an inner edge of the opening; wherein, when the plug connector is inserted into the first through hole, the rib is clamped with the at least one position limiting portion.

7. The electrical connector assembly according to claim 1, wherein the second surface of the housing includes a plurality of second retaining grooves, and the first extending portion of the at least one electrically conductive terminal further includes a plurality of stopping portions; wherein, when the at least one electrically conductive terminal is disposed in the housing, the stopping portions are clamped in the second retaining grooves, respectively.

8. The electrical connector assembly according to claim 1, wherein a quantity of the at least one electrically conductive terminal has a first electrically conductive terminal and a second electrically conductive terminal disposed opposite to each other in the first through hole.

9. The electrical connector assembly according to claim 8, wherein the crown spring portion of the first electrically conductive terminal and the crown spring portion of the second electrically conductive terminal each have a semi-cylindrical shape.

10. The electrical connector assembly according to claim 8, wherein the first electrically conductive terminal and the second electrically conductive terminal are not in physical contact with each other.

11. The electrical connector assembly according to claim 8, wherein each of the first electrically conductive terminal and the second electrically conductive terminal further includes a second extending portion, the first extending portion and the second extending portion are respectively connected to two opposite sides of the corresponding crown spring portion, the second extending portion includes a plurality of second pins, and the second pins are exposed from the housing.

* * * * *